United States Patent
Kitagawa et al.

(10) Patent No.: US 9,941,510 B2
(45) Date of Patent: Apr. 10, 2018

(54) ELECTRODE MATERIAL, ELECTRODE, AND LITHIUM ION BATTERY

(71) Applicant: SUMITOMO OSAKA CEMENT CO., LTD., Chiyoda-ku, Tokyo (JP)

(72) Inventors: Takao Kitagawa, Tokyo (JP); Tetsuya Nakabeppu, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 95 days.

(21) Appl. No.: 14/259,197

(22) Filed: Apr. 23, 2014

(65) Prior Publication Data

US 2014/0322613 A1    Oct. 30, 2014

(30) Foreign Application Priority Data

Apr. 26, 2013   (JP) .................................. 2013-093969

(51) Int. Cl.
  *H01M 4/00*     (2006.01)
  *H01M 4/36*     (2006.01)
  *H01M 4/62*     (2006.01)
  *H01M 4/131*    (2010.01)
  *H01M 4/1391*   (2010.01)

(52) U.S. Cl.
  CPC ............. *H01M 4/366* (2013.01); *H01M 4/62* (2013.01); *H01M 4/625* (2013.01); *H01M 4/131* (2013.01); *H01M 4/1391* (2013.01)

(58) Field of Classification Search
  CPC ........ H01M 4/366; H01M 4/626; H01M 4/62; H01M 4/625; H01M 4/1391; H01M 4/131

USPC .......................................................... 429/232
See application file for complete search history.

(56) References Cited

U.S. PATENT DOCUMENTS

| | | | |
|---|---|---|---|
| 2009/0087660 A1* | 4/2009 | Suzuki | H01M 4/366 428/403 |
| 2010/0261063 A1* | 10/2010 | Kitagawa | C01B 25/37 429/232 |
| 2014/0212756 A1* | 7/2014 | Sakaguchi | H01M 4/5825 429/221 |

FOREIGN PATENT DOCUMENTS

| | | | | |
|---|---|---|---|---|
| JP | A-2001-015111 | | 1/2001 | |
| JP | 2003059492 A | * | 2/2003 | |
| JP | A-2009-087682 | | 4/2009 | |
| WO | WO 2012137572 A1 | * | 10/2012 | .......... H01M 4/5825 |

OTHER PUBLICATIONS

Machine translation of JP 2003-059492A, obtained Dec. 4, 2015.*
Office Action for Japanese Patent Application No. 2013-093969 (dated Aug. 25, 2015).

* cited by examiner

*Primary Examiner* — Nicholas P D'Aniello
(74) *Attorney, Agent, or Firm* — Merchant & Gould P.C.

(57) ABSTRACT

An electrode material is provided in which a carbon coating film containing an ion-conductive material is formed on surfaces of electrode-active material particles, and at least a portion of a surface of the ion-conductive material is exposed without being coated with the carbon coating film or the ion-conductive material is surrounded by the carbon coating film.

15 Claims, 2 Drawing Sheets

ELECTRODE MATERIAL, ELECTRODE, AND LITHIUM ION BATTERY

This application claims priority to Japanese Patent Application No. 2013-093969 filed 26 Apr. 2013, the disclosure of which is hereby incorporated by reference in its entirety.

BACKGROUND OF THE INVENTION

Field of the Invention

The present invention relates to an electrode material, an electrode, and a lithium ion battery. In particular, the invention relates to a cathode material for a battery, an electrode material which is suitably used for a cathode material for a lithium ion battery, an electrode including this electrode material, and a lithium ion battery including a cathode formed of this electrode.

Description of Related Art

Recently, as a battery in which a reduction in size and weight and an increase in capacity are expected, a non-aqueous electrolytic solution secondary battery such as a lithium ion battery has been proposed and has been utilized in practice. A lithium ion battery includes a cathode and an anode which have a property capable of reversibly inserting and extracting lithium ions, and a non-aqueous electrolyte.

As an anode material and an anode active material of a lithium ion battery, a Li-containing metal oxide, such as a carbon-based material or lithium titanate ($Li_4Ti_5O_{12}$), which has a property capable of reversibly inserting and extracting lithium ions is commonly used.

On the other hand, as a cathode material and a cathode active material of a lithium ion battery, an electrode material mixture including: a Li-containing metal oxide, such as lithium iron phosphate ($LiFePO_4$), which has a property capable of reversibly inserting and extracting lithium ions; and a binder is used. By coating this electrode material mixture on a surface of a metal foil, known as a current collector, a cathode of a lithium ion battery is formed.

Such lithium ion batteries have a lighter weight, a smaller size, and higher energy than those of secondary batteries of the related art such as lead batteries, nickel-cadmium batteries, or nickel metal hydride batteries. Therefore, lithium ion batteries are used not only as a small-sized power supply for portable electronic equipment such as mobile phones or laptop PCs but as a stationary-type extremely-large-sized power supply.

In addition, recently, lithium ion batteries have been studied as a high-output power supply for plug-in hybrid vehicles, hybrid vehicles, electric tools, or the like. For a battery which is used as a high-output power supply, high-speed charge-discharge characteristics are required.

However, an electrode-active material, for example, an electrode material containing a lithium phosphate compound which has a property capable of reversibly inserting and extracting lithium ions has a problem of low electron conductivity. An electrode material is disclosed in which surfaces of electrode-active material particles are coated with an organic compound which is a carbon source in order to increase the electron conductivity of the electrode material, and the organic compound is carbonized. As a result, a carbon coating film is formed on the surface of the electrode-active material, and carbon in the carbon coating film is interposed between the electrode-active material particles as an electron conductive material (refer to Japanese Laid-Open Patent Publication No. 2001-15111).

SUMMARY OF THE INVENTION

In order to use an electrode-active material containing a lithium phosphate compound as an electrode material of a lithium ion battery which is used as a high-output power supply, it is necessary that a carbon coating film be formed on a surface of an electrode-active material to increase the electron conductivity.

However, this carbon coating film functions not only as a barrier during an oxidation-reduction reaction of lithium ions, but also as a diffusion barrier of lithium ions. Therefore, as the coverage of the carbon coating film is increased and as the thickness of the carbon coating film is increased, the conductivity of lithium ions is decreased. As a result, a trade-off relationship is established between improvement in electron conductivity and improvement in lithium ion conductivity. For example, in an electrode-active material in which a carbon coating film is provided, the electron conductivity is increased, whereas the lithium ion conductivity is decreased. As a result, the total sum of the internal resistance of a battery is increased, and particularly a voltage is significantly decreased during high-speed charging and discharging.

An aspect of the invention has been made in order to solve the above-described problems, and an object thereof is to provide: an electrode material capable of improving, when an electrode-active material on which a carbon coating film is formed is used as the electrode material, not only the electron conductivity but the lithium ion conductivity by forming a composite body of a compound having lithium ion conductivity and the carbon coating film; an electrode; and a lithium ion battery.

As a result of thorough investigation for solving the above-described problems, the present inventors found that, by adopting an electrode material in which a carbon coating film containing an ion-conductive material is formed on surfaces of electrode-active material particles, the electron conductivity is improved without impairing the lithium ion conductivity; as a result, an electrode material having electron conductivity and lithium ion conductivity which satisfy high-speed charge-discharge characteristics can be realized. Based on this finding, the invention has been completed.

That is, according to a first aspect of the invention, there is provide an electrode material, in which a carbon coating film containing an ion-conductive material is formed on surfaces of electrode-active material particles, and at least a portion of a surface of the ion-conductive material is exposed without being coated with the carbon coating film or the ion-conductive material is surrounded by the carbon coating film.

In the ion-conductive material, in order to maintain charge balance during the transfer of lithium ions, it is preferable that the electron conductivity be high. In addition, it is preferable that at least a portion of the ion-conductive material be in contact with the carbon coating film on the surface of the electrode-active material to secure the electron conductivity.

When at least a portion of the surface of the ion-conductive material is exposed without being coated with the carbon coating film, the electron conductivity is sufficiently high. In addition, by selecting the ion-conductive material having high ion conductivity, an effect of the carbon coating film functioning as a barrier of an oxidation-reduction reaction of lithium ions and an effect of inhibiting the diffusion of lithium ions are cancelled due to the action of the ion-conductive material, and the ion conductivity of the electrode material can be improved. On the other hand, when the ion-conductive material is surrounded by the carbon coating film, the electron conductivity is sufficient. In addition, by selecting the ion-conductive material having higher ion conductivity than that of the carbon coating film, the ion conductivity of the electrode material can be improved.

In the electrode material according to the first aspect, it is preferable that a mass ratio of the ion-conductive material be in a range of 0.1% by mass to 30% by mass.

The reason is as follows. It is not preferable that the mass ratio of the ion-conductive material be less than 0.1% by mass because the effect of improving the lithium ion conductivity is not sufficient. In addition, it is also not preferable that the mass ratio of the ion-conductive material be greater than 30% by mass because the mass ratio of the electrode-active material is decreased, and the battery capacity is decreased. The mass ratio of the ion-conductive material is more preferably in a range of 1% by mass to 20% by mass.

In the electrode material according to the first aspect, it is preferable that a coverage of the carbon coating film on the surfaces of the electrode-active material particles be 50% or greater.

The reason is as follows. It is not preferable that the coverage of the carbon coating film be less than 50% because the impartment of electron conductivity to the electrode-active material is insufficient.

In the electrode material according to the first aspect, it is preferable that the carbon coating film be formed by mixing the electrode-active material particles, the ion-conductive material, and a carbon coating film precursor with each other to obtain a mixture and heating the mixture.

In addition, it is preferable that the electrode-active material particles and the ion-conductive material be in contact with each other; and that at least a partial component of the ion-conductive material be solid-solubilized in the electrode-active material particles.

It is preferable that at least a portion of the ion-conductive material be in contact with the electrode-active particles; and that the ion-conductive material and the electrode-active material be partially or entirely solid-solubilized because the lithium ion conductivity does not deteriorate at an interface between the ion-conductive material and the electrode-active material. In addition, when crystal structures of the ion-conductive material and the electrode-active material are different, it is not necessary that the ion-conductive material and the electrode-active material be partially solid-solubilized, and the ion-conductive material and the electrode-active material only need to be in contact with each other. In addition, the ion-conductive material may not be in contact with the electrode-active material, and the entire periphery thereof may be surrounded by the carbon coating film.

The ion-conductive material may be uniformly present on the entire surfaces of the electrode-active material particles, may be unevenly distributed on the surfaces of the electrode-active material particles in the particle form, may be unevenly distributed on the surfaces of the electrode-active material particles in a conical shape, or may be unevenly distributed on the surfaces of the electrode-active material particles in a cylindrical shape.

The ion-conductive material only needs to be a compound having lithium ion conductivity, and the ion-conductive material may be crystalline or amorphous.

In the electrode material according to the first aspect, it is preferable that the ion-conductive material be a lithium compound or a manganese compound including one or more elements selected from the group consisting of Li, Fe, Mn, Co, Ni, Si, and O as a constituent element.

Specifically, the ion-conductive material can contain one element selected from the group consisting of lithium phosphate, lithium cobalt oxide, lithium nickel oxide, lithium manganese oxide, lithium titanate, manganese oxide, and $Li_xA_yD_zPO_4$ (wherein A represents one or two or more elements selected from the group consisting of Co, Mn, Ni, and Fe; D represents one or two or more elements selected from the group consisting of Mg, Ca, S, Sr, Ba, Ti, Zn, B, Al, Ga, In, Si, Ge, Sc, Y, and rare earth elements; $0<x<2$; $0<y<1.5$; and $0\leq z<1.5$) as a major component.

It is preferable that a mass ratio of carbon in the carbon coating film be 0.6% by mass to 4.0% by mass with respect to the mass of the electrode-active material particles; and that a specific surface area of the electrode-active material particles be 5 $m^2/g$ to 20 $m^2/g$.

It is preferable that the electrode-active material particles be one element selected from the group consisting of lithium cobalt oxide, lithium nickel oxide, lithium manganese oxide, lithium titanate, and $Li_xA_yD_zPO_4$ (wherein A represents one or two or more elements selected from the group consisting of Co, Mn, Ni, Fe, Cu, and Cr; D represents one or two or more elements selected from the group consisting of Mg, Ca, S, Sr, Ba, Ti, Zn, B, Al, Ga, In, Si, Ge, Sc, Y, and rare earth elements; $0<x<2$; $0<y<1.5$; and $0\leq z<1.5$).

According to a second aspect of the invention, there is provided an electrode including the electrode material according to the first aspect.

According to a third aspect of the invention, there is provided a lithium ion battery including a cathode formed of the electrode according to the second aspect.

In the electrode material according to the first aspect, a carbon coating film containing an ion-conductive material is formed on surfaces of electrode-active material particles, and at least a portion of a surface of the ion-conductive material is exposed without being coated with the carbon coating film or the ion-conductive material is surrounded by the carbon coating film. As a result, due to the action of the carbon coating film, the electron conductivity is secured. Due to the action of the ion-conductive material in which a portion of the surface is exposed and the other portion is in contact with the carbon coating film or the action of the ion-conductive material whose periphery is coated with a thin carbon coating film, the lithium ion conductivity does not deteriorate. As a result, the lithium ion conductivity is improved, and the electrode material having electron conductivity and lithium ion conductivity which satisfy high-speed charge-discharge characteristics can be realized.

The electrode according to the second aspect includes the electrode material according to the first aspect. Therefore, an electrode capable of improving the electron conductivity without impairing the lithium ion conductivity can be provided.

The lithium ion battery according to the third aspect includes a cathode formed of the electrode according to the second aspect. Therefore, the internal resistance of the battery can be suppressed to be low. As a result, there is no concern of a significant decrease in voltage, and high-speed charging and discharging can be realized.

DETAILED DESCRIPTION OF THE INVENTION

Hereinafter, an embodiment of the invention will be described using FIGS. 1 to 3.

In the respective drawings, the reduction scale varies depending on components for easy understanding of each component.

This embodiment is a merely example for easy understanding of the scope of the invention and does not limit the invention unless specified otherwise.

Electrode Material

Figure 1:
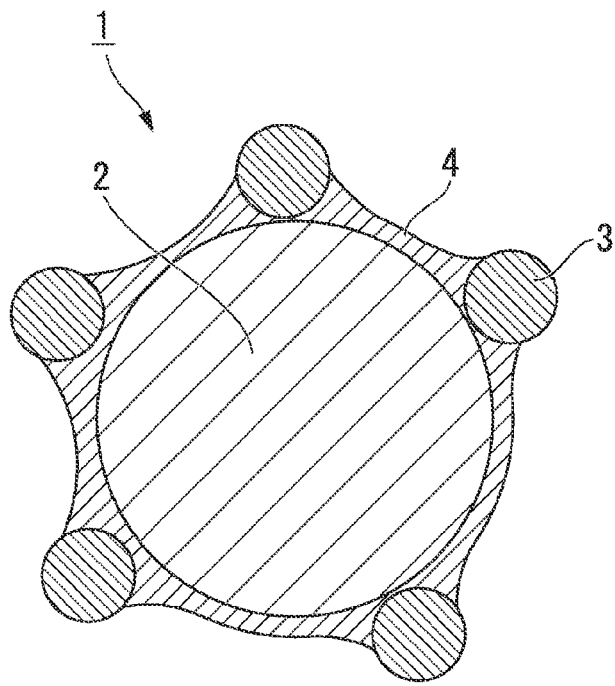
FIG. 1 is a cross-sectional view illustrating a form of an electrode material according to the invention.
Figure 2:
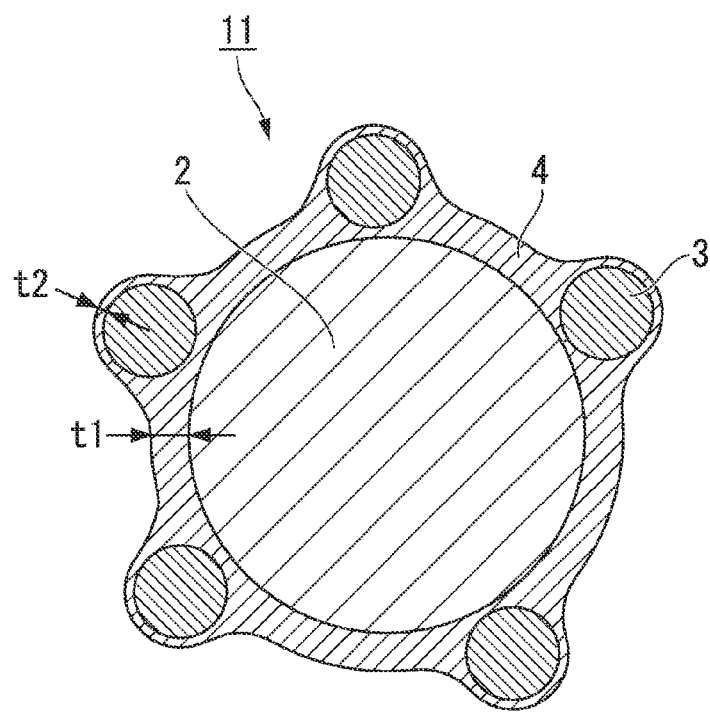
FIG. 2 is a cross-sectional view illustrating another form of an electrode material according to the invention.
Figure 3:
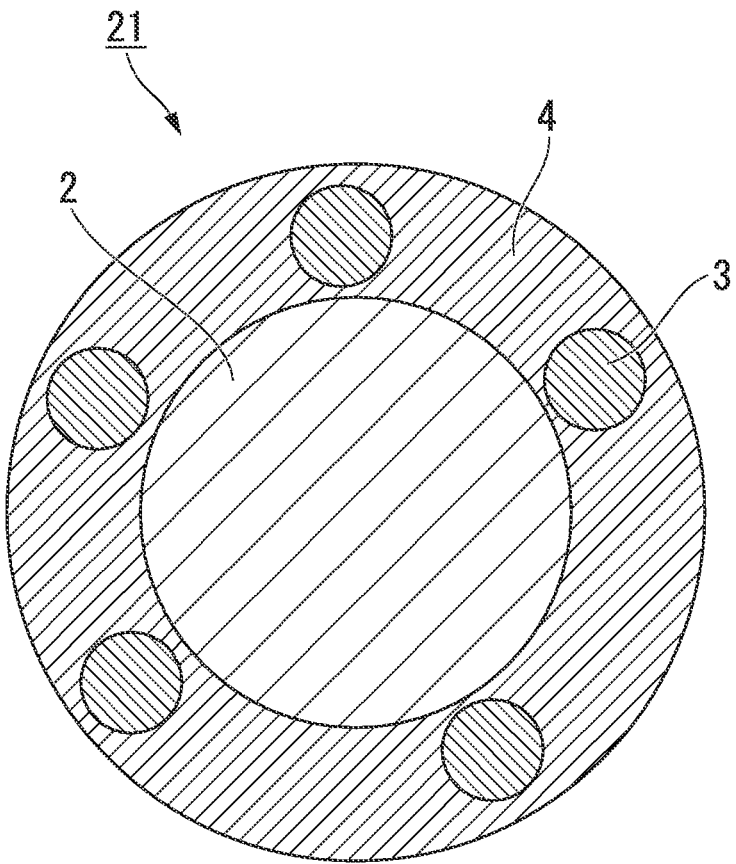
FIG. 3 is a cross-sectional view illustrating still another form of an electrode material according to the invention.

As illustrated in FIGS. 1 to 3, electrode materials 1, 11, and 21 according to the embodiment are characterized in that a carbon coating film 4 containing an ion-conductive material 3 is formed on a surface of an electrode-active material particle 2. Although the details will be described, the electrode materials 1, 11, and 21 are formed by mixing the electrode-active material particle 2, the ion-conductive material 3, and a carbon coating film precursor with each other to obtain a mixture and heating the mixture. A form of the ion-conductive material 3 contained in the carbon coating film 4 varies depending on the kind of each raw material, production conditions, and the like. For example, the affinity of the ion-conductive material 3 to the carbon coating film 4 varies depending on the kind thereof. Depending on this affinity and the thickness of the carbon coating film 4, three forms illustrated in FIGS. 1 to 3 can be adopted.

Specific forms will be described below.

In the form of the electrode material 1 illustrated in FIG. 1, the carbon coating film 4 containing the ion-conductive material 3 is formed on the surface of the electrode-active material particle 2, a portion of the surface of the ion-conductive material 3 is in contact with the carbon coating film 4, and the other portion thereof is exposed to the outside without being coated with the carbon coating film 4. In the case of the electrode material 1, the electron conductivity is sufficiently high. In addition, by selecting the ion-conductive material 3 having high ion conductivity, an effect of the carbon coating film 4 functioning as a barrier of an oxidation-reduction reaction of lithium ions and an effect of the carbon coating film 4 inhibiting the diffusion of lithium ions are cancelled in the ion-conductive material 3, and the ion conductivity of the electrode material 1 can be improved.

In the form of the electrode material 11 illustrated in FIG. 2, the carbon coating film 4 containing the ion-conductive material 3 is formed on the surface of the electrode-active material particle 2, and the surface of the ion-conductive material 3 is not exposed to the outside unlike the electrode material 1 illustrated in FIG. 1. That is, a portion of the surface of the ion-conductive material 3 is coated with a thin portion of the carbon coating film 4 having a thickness t2 less than a thickness t1 of a portion of the carbon coating film 4 on the surface of the electrode-active material particle 2 in a shape along the surface of the ion-conductive material 3. In the case of the electrode material 11, the electron conductivity is sufficient. In addition, by selecting the ion-conductive material having higher ion conductivity than that of the carbon coating film 4, the ion conductivity of the electrode material 11 can be improved. In the case of the electrode material 11 illustrated in FIG. 2, it is not preferable that the carbon coating film 4 be formed to be thick to the extent that the shape of the carbon coating film 4 on the surface of the ion-conductive material 3 does not reflect the outer shape of the ion-conductive material 3 because the carbon coating film 4 inhibits the diffusion of lithium ions. Accordingly, it is preferable that the thickness of the carbon coating film 4 on the surface of the ion-conductive material 3 be thin.

In the form of the electrode material 21 illustrated in FIG. 3, the carbon coating film 4 containing the ion-conductive material 3 is formed on the surface of the electrode-active material particle 2, and the surface of the ion-conductive material 3 is not exposed to the outside as in the electrode material 11 illustrated in FIG. 2. However, in the electrode material 21 illustrated in FIG. 3, as in the electrode material 11 of FIG. 2, the thickness of the carbon coating film 4 is not thin to the extent that a convex shape formed along the outer shape of the carbon coating film 4 is reflected on the surface shape of the carbon coating film 4, and the ion-conductive material 3 is completely buried inside the carbon coating film 4. Even in this form, the thickness of the carbon coating film 4 in a region where the ion-conductive material 3 is present is thin. As a result, an effect of the carbon coating film 4 functioning as a barrier of an oxidation-reduction reaction of lithium ions and an effect of the carbon coating film 4 inhibiting the diffusion of lithium ions are cancelled, and the ion conductivity of the electrode material 21 can be improved.

More specifically, the carbon coating film 4 is formed on the surface of the electrode-active material particle 2 with a coverage of 50% or greater. In addition, 0.1% by mass to 30% by mass of the ion-conductive material 3 at least a portion of which is in contact with the carbon coating film 4 is attached on the surface of the electrode-active material particle 2. As such, the electron conductivity is secured, and a composite body of the carbon coating film 4 and the ion-conductive material 3 which has high lithium conductivity is formed on the surface of the electrode-active material particle 2.

In such a case, the electrode-active material particles 2 coated with the carbon coating film 4 form aggregates. Hereinafter, the electrode-active material particles 2 coated with the carbon coating film 4 will be referred to as carbon-coated electrode-active material particles. This implies that the carbon-coated electrode-active material particles aggregate in a state of being in contact with each other. The contact state of the carbon-coated electrode-active material particles is not particularly limited, but is preferably an aggregate state in which the carbon-coated electrode-active material particles are strongly connected and in which the contact area is small and the contact portion has a small cross-sectional area. As such, when the contact portion between the electrode-active material particles of the carbon-coated electrode-active material particles has a small shape having a small cross-sectional area, a structure in which channel-shaped (net-shaped) gaps are three-dimensionally spread is formed inside the aggregates.

In addition, when the carbon-coated electrode-active material particles are used as an electrode material of a lithium ion battery, in order to secure the electron conductivity and control the rate of reaction relating to the insertion and extraction of lithium ions, it is preferable that 50% or greater, preferably, 80% or greater of the surfaces of the electrode-active material particles 2 be coated with the carbon coating film 4.

The coverage of the carbon coating film 4 can be measured using a transmission electron microscope (TEM) or an energy-dispersive X-ray spectrometer (EDX). It is not preferable that the coverage of the carbon coating film 4 be less than 50% because a covering effect of the carbon coating film 4 is insufficient. In addition, when the insertion and extraction reaction of lithium ions are performed on the surfaces of the electrode-active material particles 2, the resistance to the reaction relating to the insertion and extraction reaction of lithium ions is increased on portions where the carbon coating film 4 is not formed, and voltage drop is significant in the last stage of discharging.

In the ion-conductive material 3, in order to maintain charge balance during the transfer of lithium ions, it is preferable that the electron conductivity be high. In addition, it is preferable that at least a portion of the ion-conductive material 3 be in contact with the carbon coating film 4 on the surfaces of the electrode-active material particles 2 to secure the electron conductivity.

It is preferable that at least a portion of the ion-conductive material 3 be in contact with the electrode-active particles 2; and that the ion-conductive material 3 and the electrode-active material particles 2 be partially or entirely solid-solubilized. The reason is that, when the ion-conductive material 3 and the electrode-active material particles 2 are solid-solubilized, the lithium ion conductivity does not deteriorate at interfaces between the ion-conductive material 3 and the electrode-active material particles 2. In addition, when crystal structures of the ion-conductive material 3 and the electrode-active material particles 2 are different, it is not necessary that the ion-conductive material 3 and the electrode-active material particles 2 be solid-solubilized, and the ion-conductive material 3 and the electrode-active material particles 2 only need to be in contact with each other. In addition, a grain boundary may be present between the ion-conductive material 3 and the electrode-active material particles 2. Moreover, the ion-conductive material 3 may not be in contact with the electrode-active material particles 2, and the entire periphery thereof may be surrounded by the carbon coating film 4.

The ion-conductive material 3 may be uniformly present on the entire surfaces of the electrode-active material particles 2, may be unevenly distributed on the surfaces of the electrode-active material particles 2 in the particle form, may be unevenly distributed on the surfaces of the electrode-active material particles 2 in a conical shape, or may be unevenly distributed on the surfaces of the electrode-active material particles 2 in a cylindrical shape.

The ion-conductive material 3 only needs to be a compound having lithium ion conductivity, and the ion-conductive material 3 may be crystalline or amorphous.

The ion-conductive material 3 is a lithium compound or a manganese compound including one or more elements selected from the group consisting of Li, Fe, Mn, Co, Ni, Si, and O as a constituent element. Specifically, the ion-conductive material 3 can contain one element selected from the group consisting of lithium phosphate, lithium cobalt oxide, lithium nickel oxide, lithium manganese oxide, lithium titanate, manganese oxide, and $Li_xA_yD_zPO_4$ (wherein A represents one or two or more elements selected from the group consisting of Co, Mn, Ni, and Fe; D represents one or two or more elements selected from the group consisting of Mg, Ca, S, Sr, Ba, Ti, Zn, B, Al, Ga, In, Si, Ge, Sc, Y, and rare earth elements; $0<x<2$; $0<y<1.5$; and $0 \le z<1.5$) as a major component.

The thickness of the carbon coating film 4 is 1.0 nm to 10.0 nm, and the average thickness thereof is preferably 2.0 nm to 7.0 nm. The reason why the average thickness of the carbon coating film 4 is 2.0 nm to 7.0 nm is as follows. When the average particle size is less than 2.0 nm, the total transfer resistance of electrons in the carbon coating film 4 is increased. As a result, the internal resistance of a battery is increased, and a decrease in voltage at a high charge-discharge rate becomes significant. On the other hand, when the average thickness is greater than 7.0 nm, lithium ion transfer resistance is increased due to steric hindrance during the diffusion of lithium ions in the carbon coating film 4. As a result, the internal resistance of a battery is increased, and a decrease in voltage at a high charge-discharge rate becomes significant. When the thickness of the carbon coating film 4 is less than 1.0 nm, it is difficult to maintain the average thickness to be greater than 2.0 nm. On the other hand, when the thickness of the carbon coating film 4 is greater than 10.0 nm, it is difficult to suppress the average thickness to be 7.0 nm or less.

"The internal resistance" described herein refers to the sum of the electron transfer resistance and the lithium ion transfer resistance. The electron transfer resistance is in proportion to the thickness of the carbon coating film, the density of the carbon coating film, and the crystallinity. The lithium ion transfer resistance is in inverse proportion to the thickness of the carbon coating film, the density of the carbon coating film, and the crystallinity.

As a method of evaluating the internal resistance, for example, a current rest method may be used. In the current rest method, the internal resistance is measured as the sum of interconnection resistance, contact resistance, electron transfer resistance, lithium ion transfer resistance, lithium reaction resistance of a cathode and an anode, interelectrode resistance determined by a distance between a cathode and an anode, resistance relating to solvation and desolvation of lithium ions, and solid electrolyte interface (SEI) resistance of lithium ions.

The volume density of the aggregates is preferably 50 vol % to 80 vol %, more preferably 55 vol % to 75 vol %, and still more preferably 60 vol % to 75 vol % with respect to the volume density of a case where the aggregates are solid.

The solid aggregates are aggregates where no gaps are present, and the density of the solid aggregates is equivalent to the theoretical density of the electrode-active material.

The volume density can be measured using a mercury porosimeter and can be calculated based on the total mass of the electrode material formed of the aggregates and the volume of gaps between particles forming the aggregates. In other words, the volume density refers to the density of the aggregates which is calculated based on the volume of gaps between particles inside particles forming the aggregates obtained by subtracting the volume of gaps between the particles from the total volume of gaps between the particles forming the aggregates; and the total mass of the electrode material formed of the aggregates.

As such, when the volume density of the aggregates is 50 vol % to 80 vol %, the aggregates are densified in a state where a certain amount of pores (gaps) are present, and thus the strength of the entire aggregates is increased. For example, when the electrode-active material is mixed with a binder, an auxiliary conductive agent, and a solvent to prepare an electrode slurry, the aggregates are not easily collapsed. As a result, an increase in the density of the electrode slurry is suppressed, and fluidity is secured. As a result, a coating property is improved, and a filling property of the electrode-active material in a coating film of the electrode slurry can be improved.

It is preferable that the electrode-active material forming the electrode-active material particles 2 can contain one element selected from the group consisting of lithium cobalt oxide, lithium nickel oxide, lithium manganese oxide, lithium titanate, and $Li_xA_yD_zPO_4$ (wherein A represents one or two or more elements selected from the group consisting of Co, Mn, Ni, Fe, Cu, and Cr; D represents one or two or more elements selected from the group consisting of Mg, Ca, S, Sr, Ba, Ti, Zn, B, Al, Ga, In, Si, Ge, Sc, Y, and rare earth elements; 0<x<2; 0<y<1.5; and 0≤z<1.5) as a major component.

In such a case, it is preferable that A represent Co, Mn, Ni, or Fe because a high discharge potential is easily obtained. It is preferable that D represent Mg, Ca, Sr, Ba, Ti, Zn, or Al because a high discharge potential is easily obtained.

The rare earth elements described herein refer to 15 lanthanum-based elements of La, Ce, Pr, Nd, Pm, Sm, Eu, Gd, Tb, Dy, Ho, Er, Tm, Yb, and Lu.

In the carbon-coated electrode-active material particles, the specific surface area of the electrode-active material particles 2 is preferably 5 m²/g to 20 m²/g and more preferably 9 m²/g to 13 m²/g.

When the electrode material is evaluated, a 2032 coin cell having a 60 μm-thick electrode film is used, and a method of measuring the internal resistance of the electrode material with a current rest method is used. The internal resistance obtained in this way is preferably 20Ω or lower.

The reason for limiting the internal resistance to be 20Ω or lower is as follows. When the internal resistance is higher than 20Ω, it is necessary that the thickness of the electrode film be decreased to decrease the internal resistance as a battery, and thus the battery capacity per electrode is decreased. As a result, in order to obtain a desired battery capacity of the battery, it is necessary that the number of electrodes be increased.

It is not preferable that the number of electrodes be increased because the number of electrode members such as a current collector or a separator which have no battery activity is increased according to the number of electrodes, and thus the battery capacity is decreased.

Method of Producing Electrode Material

A method of producing the electrode material according to the embodiment is not particularly limited, but for example, a method can be used, the method including: mixing an electrode-active material or a precursor thereof, an ion-conductive material, an organic compound and water with each other to prepare a slurry in which a ratio (D90/D10) of a particle size (D90) having a cumulative volume percent of 90% to a particle size (D10) having a cumulative volume percent of 10% in a particle size distribution of the electrode-active material or the precursor thereof is 5 to 30; drying the slurry to obtain a dry material; baking the dry material in a non-oxidizing atmosphere at 500° C. to 1000° C. to form a carbon coating film containing the ion-conductive material on surfaces of electrode-active material particles, in which at least a portion of the ion-conductive material is exposed without being coated with the carbon coating film, or the ion-conductive material is surrounded by the carbon coating film.

Similarly to the case of the electrode material, it is preferable that the electrode-active material can contain one element selected from the group consisting of lithium cobalt oxide, lithium nickel oxide, lithium manganese oxide, lithium titanate, and $Li_xA_yD_zPO_4$ (wherein A represents one or two or more elements selected from the group consisting of Co, Mn, Ni, Fe, Cu, and Cr; D represents one or two or more elements selected from the group consisting of Mg, Ca, S, Sr, Ba, Ti, Zn, B, Al, Ga, In, Si, Ge, Sc, Y, and rare earth elements; 0<x<2; 0<y<1.5; and 0≤z<1.5) as a major component.

In such a case, it is preferable that A represent Co, Mn, Ni, or Fe because a high discharge potential is easily obtained, and it is preferable that D represent Mg, Ca, Sr, Ba, Ti, Zn, or Al because a high discharge potential is easily obtained.

The rare earth elements described herein refer to 15 lanthanum-based elements of La, Ce, Pr, Nd, Pm, Sm, Eu, Gd, Tb, Dy, Ho, Er, Tm, Yb, and Lu.

A compound represented by $Li_xA_yD_zPO_4$ ($Li_xA_yD_zPO_4$ powder) can be prepared using a method of the related art such as a solid-phase method, a liquid-phase method, or a gas-phase method.

This $Li_xA_yD_zPO_4$ compound which can be preferably used is prepared as follows. For example, a Li source selected from the group consisting of lithium salts such as lithium acetate ($LiCH_3COO$) or lithium chloride (LiCl) and lithium hydroxide (LiOH); a divalent iron salt such as iron chloride (II) ($FeCl_2$), iron acetate (II) ($Fe(CH_3COO)_2$), or iron sulfate (II) ($FeSO_4$); a phosphate compound such as phosphoric acid ($H_3PO_4$), ammonium dihydrogen phosphoate ($NH_4H_2PO_4$), or diammonium hydrogen phosphoate ($(NH_4)_2HPO_4$); and water are mixed to obtain a slurry mixture. The slurry mixture is hydrothermally synthesized using a pressure resistant sealed container, the obtained precipitates are washed with water to form a cake-shaped precursor material, and this cake-shaped precursor material is baked to obtain the compound ($Li_xA_yD_zPO_4$ particles).

The $Li_xA_yD_zPO_4$ powder may be formed of crystalline particles or amorphous particles or may be formed of mixed particles of crystalline particles and amorphous particles. The reason why the $Li_xA_yD_zPO_4$ powder may be formed of amorphous particles is that the amorphous $Li_xA_yD_zPO_4$ powder is crystallized when being heated in a non-oxidizing atmosphere in a temperature range of 500° C. to 1000° C.

The particle size of the electrode-active material is not particularly limited, but the average particle size of primary particles is preferably 0.01 μm to 20 μm and more preferably 0.02 μm to 5 μm.

The reason for limiting the average particle size of the primary particles of the electrode-active material to the above-described range is as follows. It is not preferable that the average primary particle size be less than 0.01 μm because it is difficult to sufficiently coat the surfaces of the primary particles with a carbon thin film, the discharge capacity at a high charge-discharge rate is decreased, and it is difficult to realize sufficient charge-discharge rate performance. On the other hand, when the average primary particle size is greater than 20 μm, the internal resistance of the primary particles is increased, and the discharge capacity at a high charge-discharge rate is insufficient.

The shape of the electrode-active material is not particularly limited, but is preferably spherical and particularly preferably true-spherical because spherical aggregates, particularly, true-spherical aggregates are easily formed.

The reason why a spherical shape is preferable as the shape of the electrode-active material is as follows. When a cathode-forming paste is prepared by mixing the electrode-active material, a binder resin (binder), and a solvent with each other, the amount of the solvent can be reduced, and a cathode-forming paste is easily coated on a current collector.

In addition, it is preferable that the shape of the electrode-active material be spherical because the surface area of an electrode-active material is minimal, the blending amount of a binder resin (binder) added to an electrode material mixture can be minimized, and the internal resistance of the obtained cathode can be decreased.

Further, when the shape of the electrode-active material is spherical, the electrode-active material is easily closepacked. Therefore, the filling amount of a cathode material per unit volume is increased. Accordingly, the electrode density can be increased. As a result, the capacity of a lithium ion battery can be increased.

Similarly to the case of the electrode material, the ion-conductive material includes one or more elements selected from the group consisting of Li, Fe, Mn, Co, Ni, Si, and O as a constituent element. Specifically, the ion-conductive material can contain one element selected from the group consisting of lithium phosphate, lithium cobalt oxide, lithium nickel oxide, lithium manganese oxide, lithium titanate, manganese oxide, and $Li_xA_yD_zPO_4$ (wherein A represents one or two or more elements selected from the group consisting of Co, Mn, Ni, and Fe; D represents one or two or more elements selected from the group consisting of Mg, Ca, S, Sr, Ba, Ti, Zn, B, Al, Ga, In, Si, Ge, Sc, Y, and rare earth elements; $0<x<2$; $0<y<1.5$; and $0≤z<1.5$) as a major component.

The organic compound is not particularly limited as long as it can form a carbon coating film on the surfaces of the electrode-active material particles, and examples thereof include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, dihydric alcohol, and trihydric alcohol.

Regarding a blending ratio of the electrode-active material and the organic compound, the total amount of the organic compound in terms of the amount of carbon is preferably 0.6 parts by mass to 4.0 parts by mass and more preferably 1.1 parts by mass to 1.7 parts by mass with respect to 100 parts by mass of the electrode-active material.

When the blending ratio of the organic compound in terms of the amount of carbon is less than 0.6 parts by mass, the discharge capacity at a high charge-discharge rate is decreased during the formation of a battery, and it is difficult to realize sufficient charge-discharge rate performance. On the other hand, when the blending ratio of the organic compound in terms of the amount of carbon is greater than 4.0 parts by mass, lithium ion transfer resistance is increased due to steric hindrance during the diffusion of lithium ions in the carbon coating film. As a result, during the formation of a battery, the internal resistance of a battery is increased, and a decrease in voltage at a high charge-discharge rate is not tolerable.

The electrode-active material, the ion-conductive material, and the organic compound are dissolved or dispersed in water to prepare a uniform slurry. During dissolving or dispersing, it is more preferable that a dispersant be added. A method of dissolving or dispersing the electrode-active material, the ion-conductive material, and the organic compound in water is not particularly limited as long as the electrode-active material can be dispersed and the organic compound can be dissolved or dispersed with this method. For example, a method using a dispersing machine such as a planetary ball mill, a vibration ball mill, a bead mill, a paint shaker, or an attritor is preferable.

During dissolving or dispersing, primary particles of the electrode-active material is dispersed in water, and then the ion-conductive material and the organic compound are added thereto and stirred to be dissolved therein. As such, the surfaces of the primary particles of the electrode-active material are coated with the organic compound, and the ion-conductive material is surrounded by the organic compound. As a result, the ion-conductive material is unevenly distributed on the surfaces of the primary particles of the electrode-active material, and the surface of the electrode-active material and at least a portion of the ion-conductive material are coated with carbon derived from the organic compound.

During the preparation of the slurry, dispersing conditions of the slurry such as the concentrations of the electrode-active material and the organic compound in the slurry or the stirring time are appropriately adjusted such that the ratio (D90/D10) of the electrode-active material or the precursor thereof is 5 to 30. As a result, the volume density of the obtained aggregates can be controlled to be 50 vol % to 80% with respect to the volume density of a case where the aggregates are solid.

Next, the slurry was sprayed and dried in the air at a high temperature of, for example, 70° C. to 250° C. to obtain a dry material.

Next, this dry material is baked in an non-oxidizing atmosphere in a temperature range of 500° C. to 1000° C. and preferably 600° C. to 900° C. for 0.1 hours to 40 hours.

As the non-oxidizing atmosphere, an inert atmosphere such as nitrogen ($N_2$) or argon (Ar) is preferable. When it is desired that the oxidation be further suppressed, a reducing atmosphere containing several vol % of reducing gas such as hydrogen ($H_2$) is preferable. In addition, in order to remove organic components evaporated in a non-oxidizing atmosphere during baking, combustion-susceptible or combustible gas such as oxygen ($O_2$) may be introduced into an inert atmosphere.

The reason for limiting the baking temperature to be 500° C. to 1000° C. is as follows. It is not preferable that the baking temperature be lower than 500° C. because the decomposition and reaction of the organic compound contained in the dry material is not sufficiently progressed, the carbonization of the organic compound is insufficient, and the high-resistance decomposition products of the organic compound are formed in the obtained aggregates. On the other hand, when the baking temperature is higher than 1000° C., Li in the electrode-active material is evaporated, and the composition of the electrode-active material is deviated. In addition, the grain growth of the electrode-active material is promoted, the discharge capacity at a high charge-discharge rate is decreased, and it is difficult to realize sufficient charge-discharge rate performance.

During this baking process, the particle size distribution of the obtained aggregates can be controlled by appropriately controlling baking conditions of the dry material such as a temperature increase rate, a maximum holding temperature, or a holding time.

As such, the surfaces of the primary particles of the electrode-active material are coated with carbon produced by the organic compound in the dry material being thermally decomposed, and the ion-conductive material is surrounded by the carbon. As a result, the ion-conductive material is unevenly distributed on the surfaces of the primary particles of the electrode-active material, and the aggregates are obtained, in which the surface of the electrode-active material and at least a portion of the ion-conductive material is coated with carbon, and carbon is interposed between the primary particles of the electrode-active material.

Electrode

An electrode according to an embodiment of the invention includes the electrode material according to the embodiment.

In order to prepare the electrode according to the embodiment, the above-described electrode material, a binder formed of a binder resin, and a solvent are mixed to prepare an electrode-forming coating material or an electrode-forming paste. At this time, a conductive auxiliary agent such as carbon black may be optionally added.

As the binder, that is, the binder resin, for example, polytetrafluoroethylene (PTFE) resin, polyvinylidene fluoride (PVdF) resin, or fluororubber is preferably used.

A blending ratio of the binder resin to the electrode material is not particularly limited but, for example, is 1 part by mass to 30 parts by mass and preferably 3 parts by mass to 20 parts by mass with respect to 100 parts by mass of the electrode material.

A solvent used for the electrode-forming coating material or the electrode-forming paste may be appropriately selected according to the properties of the binder resin. Examples of the solvent include water; alcohols such as methanol, ethanol, 1-propanol, 2-propanol (isopropyl alcohol; IPA), butanol, pentanol, hexanol, octanol, or diacetone alcohol; esters such as ethyl acetate, butyl acetate, ethyl lactate, propylene glycol monomethyl ether acetate, propylene glycol monoethyl ether acetate, or γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, or diethylene glycol monoethyl ether; ketones such as acetone, methyl ethyl ketone (MEK), methyl isobutyl ketone (MIBK), acetylacetone, or cyclohexanone; amides such as dimethyl formamide, N,N-dimethylacetoacetamide, or N-methyl pyrrolidone; and glycols such as ethylene glycol, diethylene glycol, or propylene glycol. These solvents may be used alone or in a combination of two or more kinds.

Next, the electrode-forming coating material or the electrode-forming paste is coated on a single surface of a metal foil, followed by drying. As a result, a metal foil with a single surface on which a coating film formed of a mixture of the electrode material and the binder resin is formed is obtained.

Next, this coating film is pressed. As a result, a current collector (electrode) including an electrode material layer on a single surface of the metal foil is prepared.

As such, the electrode according to the embodiment capable of improving the electron conductivity without impairing the lithium ion conductivity can be prepared.

Lithium Ion Battery

A lithium ion battery according to an embodiment of the invention includes a cathode formed of the electrode according to the embodiment.

In such a lithium ion battery, the internal resistance of an electrode can be decreased by preparing the electrode using the electrode material according to the embodiment. Therefore, the internal resistance of the battery can be suppressed to be low. As a result, the lithium ion battery having no concern of a significant decrease in voltage and capable of realizing high-speed charging and discharging can be provided.

In the lithium ion battery according to the embodiment, an anode, an electrolytic solution, a separator, or the like is not particularly limited. For example, as the anode, an anode material such as metal Li, a carbon material, an Li alloy, or $Li_4Ti_5O_{12}$ can be used. In addition, a solid electrolyte may be used instead of the electrolytic solution and the separator.

As described above, in the electrode material according to the embodiment, the carbon coating film is formed on the surfaces of the electrode-active material particles with a coverage of 50% or greater, and 0.1% by weight to 30% by weight of the ion-conductive material at least a portion of which is in contact with the carbon coating film is attached on the surfaces of the electrode-active material particles. As such, the electron conductivity is secured, and a composite of the carbon coating film and the ion-conductive material which has high lithium conductivity is formed on the surfaces of the electrode-active material particles. As a result, the lithium ion conductivity of the electrode material can be improved.

Further, the internal resistance of the electrode material can be decreased by controlling the carrying amount of carbon, the thickness of the carbon coating film, the density of the carbon coating film, the specific surface area of the electrode-active material particles, and the mass percent of carbon components forming the carbon coating film.

The electrode according to the embodiment includes the electrode material according to the embodiment. As a result, the electrode capable of improving the lithium ion conductivity without impairing the electron conductivity can be provided.

The lithium ion battery according to the embodiment includes a cathode formed of the electrode according to the embodiment. Therefore, the internal resistance of the battery can be suppressed to be low. As a result, there is no concern of a significant decrease in voltage, and high-speed charging and discharging can be realized.

Further, when the electrode material in which the carrying amount of carbon, the thickness of the carbon coating film, the density of the carbon coating film, the specific surface area of the electrode-active material particles, and the mass percent of carbon components forming the carbon coating film are controlled is used as a lithium ion battery, the internal resistance of the battery is decreased, and the lithium ion battery can be used as a high-output power source.

EXAMPLES

Hereinafter, the invention will be described using Examples 1 to 19 and Comparative Example 1, but is not limited to these examples.

In the above-described examples, metal Li was used as the anode to reflect the behavior of the electrode material on data. However, an anode material such as a carbon material, a Li alloy, or $Li_4Ti_5O_{12}$ may be used. In addition, a solid electrolyte may be used instead of the electrolytic solution and the separator.

Example 1

Preparation of Electrode Material 4 mol of lithium acetate ($LiCH_3COO$), 2 mol of iron sulfate (II) ($FeSO_4$), and 2 mol of phosphoric acid ($H_3PO_4$) were mixed with 2 L (liter) of water such that the total amount was 4 L. As a result, a uniform slurry mixture was prepared.

Next, this mixture was placed in a pressure-resistant sealed container having a volume of 8 L, followed by hydrothermal synthesis at 200° C. for 1 hour.

Next, the obtained precipitates were washed with water to form a cake-shaped precursor of an electrode-active material.

Next, 150 g (in terms of solid content) of the precursor of the electrode-active material and 0.15 g of lithium phosphate ($Li_3PO_4$) as the ion-conductive material were mixed with an aqueous polyvinyl alcohol solution obtained by dissolving 5.4 g of polyvinyl alcohol (PVA) as the organic compound in 100 g of water. As a result, a slurry was obtained. This slurry was dispersed using a two-fluid wet jet mill such that D50 in a particle size distribution of precursor particles of the electrode-active material in the slurry was 100 nm.

Next, the dispersed slurry was sprayed and dried in the air at 180° C. As a result, a dry material having an average particle size of 6 μm was obtained.

Next, the obtained dry material was baked in a nitrogen atmosphere at 700° C. for 1 hour. As a result, an electrode material of Example 1 having an average particle size of 6 μm was obtained.

Evaluation of Electrode Material

In the electrode material, the amount of carbon of an electrode-active material; and the coverage of the carbon coating film were evaluated, respectively.

The evaluation methods are as follows.

(1) Amount of Carbon

The amount of carbon of the electrode-active material was measured using a carbon analyzer.

(2) Coverage of Carbon Coating Film

When the carbon coating film of aggregates forming the electrode-active material were observed using a transmission electron microscope (TEM) or an energy-dispersive X-ray spectrometer (EDX), a ratio of portions coated with the carbon coating film in the surfaces of the aggregates was calculated as a coverage.

Preparation of Lithium Ion Battery

The electrode material, polyvinylidene fluoride (PVdF) as the binder, and acetylene black (AB) as the conductive auxiliary agent were mixed with each other at a mass ratio of 90:5:5. Further N-methyl-2-pyrrolidinone (NMP) as the solvent was added to the mixture to impart fluidity. As a result, a slurry was prepared.

Next, this slurry was coated on an aluminum (Al) foil having a thickness of 15 μm, followed by drying. Next, the aluminum foil was pressed at a pressure of 600 kgf/cm². A cathode of a lithium ion battery of Example 1 was prepared.

Relative to the cathode of the lithium ion battery, lithium metal was disposed as an anode, and a separator formed of porous polypropylene was disposed between the cathode and the anode. As a result, a battery member was obtained.

Meanwhile, ethylene carbonate and diethyl carbonate were mixed at 1:1 (volume ratio) to obtain a mixed solution, and 1 M of $LiPF_6$ was dissolved in the mixed solution. As a result, an electrolytic solution having lithium ion conductivity was prepared.

Next, the battery member was dipped in the electrolytic solution. As a result, a lithium ion battery of Example 1 was prepared.

Evaluation of Lithium Ion Battery

The internal resistance of the lithium ion battery was evaluated. The evaluation method is as follows.

A cathode having an electrode surface area of 2 cm² and an electrode density of 2.0 g/cc and an anode formed of lithium metal were disposed in a coil cell container having a diameter of 2 cm and a thickness of 3.2 mm to face each other with a separator formed of porous polypropylene and having a size of 25 μm interposed therebetween. Then, the internal resistance was calculated based on an increase in voltage and a discharge current at 1 C which were measured with a current rest method at a depth of discharge of 50% and a discharge current of 1 C. The internal resistance is shown in Table 1.

Example 2

An electrode material and a lithium ion battery of Example 2 were prepared by the same method as that of Example 1, except that 7.5 g of lithium iron phosphate ($LiFePO_4$) was mixed as the ion-conductive material. The evaluation results are shown in Table 1.

Example 3

An electrode material and a lithium ion battery of Example 3 were prepared by the same method as that of Example 1, except that 15.0 g of lithium manganese phosphate ($LiMnPO_4$) was mixed as the ion-conductive material. The evaluation results are shown in Table 1.

Example 4

An electrode material and a lithium ion battery of Example 4 were prepared by the same method as that of Example 1, except that 22.5 g of lithium cobalt phosphate ($LiCoPO_4$) was mixed as the ion-conductive material. The evaluation results are shown in Table 1.

Example 5

An electrode material and a lithium ion battery of Example 5 were prepared by the same method as that of Example 1, except that 45.0 g of lithium nickel phosphate ($LiNiPO_4$) was mixed as the ion-conductive material. The evaluation results are shown in Table 1.

Example 6

Preparation of Electrode Material 4 mol of lithium acetate ($LiCH_3COO$), 2 mol of iron sulfate (II) ($FeSO_4$), and 2 mol of phosphoric acid ($H_3PO_4$) were mixed with 2 L (liter) of water such that the total amount was 4 L. As a result, a uniform slurry mixture was prepared.

Next, this mixture was placed in a pressure-resistant sealed container having a volume of 8 L, followed by hydrothermal synthesis at 200° C. for 1 hour.

Next, the obtained precipitates were washed with water to form a cake-shaped precursor of an electrode-active material.

Next, 150 g (in terms of solid content) of the precursor of the electrode-active material and 0.15 g of lithium cobalt oxide ($LiCoO_2$) as the ion-conductive material were mixed with an aqueous polyvinyl alcohol solution obtained by dissolving 10.8 g of polyvinyl alcohol (PVA) as the organic compound in 100 g of water. As a result, a slurry was obtained. This slurry was dispersed using a two-fluid wet jet mill such that D50 in a particle size distribution of precursor particles of the electrode-active material in the slurry was 100 nm.

Next, the dispersed slurry was sprayed and dried in the air at 180° C. As a result, a dry material having an average particle size of 6 μm was obtained.

Next, the obtained dry material was baked in a nitrogen atmosphere at 700° C. for 1 hour. As a result, an electrode material of Example 6 having an average particle size of 6 μm was obtained.

Next, this electrode material was evaluated by the same method as that of Example 1.

In addition, using this electrode material, a lithium ion battery of Example 6 was prepared and evaluated by the same method as that of Example 1. The evaluation results are shown in Table 1.

Example 7

An electrode material and a lithium ion battery of Example 7 were prepared by the same method as that of Example 6, except that 7.5 g of lithium manganese oxide ($LiMn_2O_4$) was mixed as the ion-conductive material. The evaluation results are shown in Table 1.

Example 8

An electrode material and a lithium ion battery of Example 8 were prepared by the same method as that of Example 6, except that 15.0 g of lithium titanate ($Li_4Ti_5O_{12}$) was mixed as the ion-conductive material. The evaluation results are shown in Table 1.

Example 9

An electrode material and a lithium ion battery of Example 9 were prepared by the same method as that of Example 6, except that 22.5 g of lithium nickel oxide ($LiNiO_2$) was mixed as the ion-conductive material. The evaluation results are shown in Table 1.

Example 10

An electrode material and a lithium ion battery of Example 10 were prepared by the same method as that of Example 6, except that 45 g of $Li_7P_3S_{11}$ was mixed as the ion-conductive material. The evaluation results are shown in Table 1.

Example 11

Preparation of Electrode Material 4 mol of lithium acetate ($LiCH_3COO$), 2 mol of iron sulfate (II) ($FeSO_4$), and 2 mol of phosphoric acid ($H_3PO_4$) were mixed with 2 L (liter) of water such that the total amount was 4 L. As a result, a uniform slurry mixture was prepared.

Next, this mixture was placed in a pressure-resistant sealed container having a volume of 8 L, followed by hydrothermal synthesis at 200° C. for 1 hour.

Next, the obtained precipitates were washed with water to form a cake-shaped precursor of an electrode-active material.

Next, 150 g (in terms of solid content) of the precursor of the electrode-active material and 0.15 g of manganese oxide ($MnO_2$) as the ion-conductive material were mixed with an aqueous polyvinyl alcohol solution obtained by dissolving 21.6 g of polyvinyl alcohol (PVA) as the organic compound in 100 g of water. As a result, a slurry was obtained. This slurry was dispersed using a two-fluid wet jet mill such that D50 in a particle size distribution of precursor particles of the electrode-active material in the slurry was 100 nm.

Next, the dispersed slurry was sprayed and dried in the air at 180° C. As a result, a dry material having an average particle size of 6 μm was obtained.

Next, the obtained dry material was baked in a nitrogen atmosphere at 700° C. for 1 hour. As a result, an electrode material of Example 11 having an average particle size of 6 μm was obtained.

Next, this electrode material was evaluated by the same method as that of Example 1.

In addition, using this electrode material, a lithium ion battery of Example 11 was prepared and evaluated by the same method as that of Example 1. The evaluation results are shown in Table 1.

Example 12

An electrode material and a lithium ion battery of Example 12 were prepared by the same method as that of Example 11, except that 7.5 g of LiPON was mixed as the ion-conductive material. The evaluation results are shown in Table 1.

Example 13

An electrode material and a lithium ion battery of Example 13 were prepared by the same method as that of Example 11, except that 15.0 g of $Li_7La_3Zr_2O_n$ was mixed as the ion-conductive material. The evaluation results are shown in Table 1.

Example 14

An electrode material and a lithium ion battery of Example 14 were prepared by the same method as that of Example 11, except that 22.5 g of $La_{0.62}Li_{0.16}TiO_3$ was mixed as the ion-conductive material. The evaluation results are shown in Table 1.

Example 15

An electrode material and a lithium ion battery of Example 15 were prepared by the same method as that of Example 11, except that 45.0 g of $Li_{10}GeP_2S_{12}$ was mixed as the ion-conductive material. The evaluation results are shown in Table 1.

Example 16

Preparation of Electrode Material 4 mol of lithium acetate ($LiCH_3COO$), 2 mol of iron sulfate (II) ($FeSO_4$), and 2 mol of phosphoric acid ($H_3PO_4$) were mixed with 2 L (liter) of water such that the total amount was 4 L. As a result, a uniform slurry mixture was prepared.

Next, this mixture was placed in a pressure-resistant sealed container having a volume of 8 L, followed by hydrothermal synthesis at 200° C. for 1 hour.

Next, the obtained precipitates were washed with water to form a cake-shaped precursor of an electrode-active material.

Next, 150 g (in terms of solid content) of the precursor of the electrode-active material and 60.0 g of lithium cobalt oxide ($LiCoO_2$) as the ion-conductive material were mixed with an aqueous polyvinyl alcohol solution obtained by dissolving 2.16 g of polyvinyl alcohol (PVA) as the organic compound in 100 g of water. As a result, a slurry was obtained. This slurry was dispersed using a two-fluid wet jet mill such that D50 in a particle size distribution of precursor particles of the electrode-active material in the slurry was 100 nm.

Next, the dispersed slurry was sprayed and dried in the air at 180° C. As a result, a dry material having an average particle size of 6 μm was obtained.

Next, the obtained dry material was baked in a nitrogen atmosphere at 700° C. for 1 hour. As a result, an electrode material of Example 16 having an average particle size of 6 μm was obtained.

Next, this electrode material was evaluated by the same method as that of Example 1.

In addition, using this electrode material, a lithium ion battery of Example 16 was prepared and evaluated by the same method as that of Example 1. The evaluation results are shown in Table 1.

Example 17

An electrode material and a lithium ion battery of Example 17 were prepared by the same method as that of Example 16, except that 40.0 g of lithium cobalt oxide (LiCoO$_2$) as the ion-conductive material was mixed with an aqueous polyvinyl alcohol solution obtained by dissolving 3.78 g of polyvinyl alcohol (PVA) as the organic compound in 100 g of water. The evaluation results are shown in Table 1.

Example 18

An electrode material and a lithium ion battery of Example 18 were prepared by the same method as that of Example 16, except that 0.075 g of lithium cobalt oxide (LiCoO$_2$) as the ion-conductive material was mixed with an aqueous polyvinyl alcohol solution obtained by dissolving 27.0 g of polyvinyl alcohol (PVA) as the organic compound in 100 g of water. The evaluation results are shown in Table 1.

Example 19

An electrode material and a lithium ion battery of Example 19 were prepared by the same method as that of Example 16, except that 0.75 g of lithium cobalt oxide (LiCoO$_2$) as the ion-conductive material was mixed with an aqueous polyvinyl alcohol solution obtained by dissolving 4.25 g of polyvinyl alcohol (PVA) as the organic compound in 100 g of water. The evaluation results are shown in Table 1.

Comparative Example 1

Preparation of Electrode Material 4 mol of lithium acetate (LiCH$_3$COO), 2 mol of iron sulfate (II) (FeSO$_4$), and 2 mol of phosphoric acid (H$_3$PO$_4$) were mixed with 2 L (liter) of water such that the total amount was 4 L. As a result, a uniform slurry mixture was prepared.

Next, this mixture was placed in a pressure-resistant sealed container having a volume of 8 L, followed by hydrothermal synthesis at 200° C. for 1 hour.

Next, the obtained precipitates were washed with water to form a cake-shaped precursor of an electrode-active material.

Next, 150 g (in terms of solid content) of the precursor of the electrode-active material was mixed with an aqueous polyvinyl alcohol solution obtained by dissolving 27.0 g of polyvinyl alcohol (PVA) as the organic compound in 100 g of water. As a result, a slurry was obtained. This slurry was dispersed using a two-fluid wet jet mill such that D50 in a particle size distribution of precursor particles of the electrode-active material in the slurry was 100 nm.

Next, the dispersed slurry was sprayed and dried in the air at 180° C. As a result, a dry material having an average particle size of 6 μm was obtained.

Next, the obtained dry material was baked in a nitrogen atmosphere at 700° C. for 1 hour. As a result, an electrode material of Comparative Example 1 having an average particle size of 6 μm was obtained.

Next, this electrode material was evaluated by the same method as that of Example 1.

In addition, using this electrode material, a lithium ion battery of Comparative Example 1 was prepared and evaluated by the same method as that of Example 1. The evaluation results are shown in Table 1.

TABLE 1

| | Amount of Carbon wt % | Ion-conductive Material | Ion-conductive Material wt % | Coverage of Carbon % | Internal Resistance Ω |
|---|---|---|---|---|---|
| Example 1 | 1 | Lithium Phosphate | 0.1 | 90 | 19.9 |
| Example 2 | 1 | Lithium Iron Phosphate | 5 | 71 | 18.3 |
| Example 3 | 1 | Lithium Manganese Phosphate | 10 | 65 | 15.4 |
| Example 4 | 1 | Lithium Cobalt Phosphate | 15 | 60 | 15.8 |
| Example 5 | 1 | Lithium Nickel Phosphate | 30 | 55 | 17.6 |
| Example 6 | 2 | Lithium Cobalt Oxide | 0.1 | 95 | 16.5 |
| Example 7 | 2 | Lithium Manganese Oxide | 5 | 74 | 14.3 |
| Example 8 | 2 | Lithium Titanate | 10 | 68 | 11.6 |
| Example 9 | 2 | Lithium Nickel Oxide | 15 | 62 | 13.4 |
| Example 10 | 2 | Li$_7$P$_3$S$_{11}$ | 30 | 58 | 15.2 |
| Example 11 | 4 | Manganese Oxide | 0.1 | 98 | 18.1 |
| Example 12 | 4 | LiPON | 5 | 80 | 16.4 |
| Example 13 | 4 | Li$_7$La$_3$Zr$_2$O$_{12}$ | 10 | 70 | 13.8 |
| Example 14 | 4 | La$_{0.62}$Li$_{0.16}$TiO$_3$ | 15 | 65 | 14.8 |
| Example 15 | 4 | Li$_{10}$GeP$_2$S$_{12}$ | 30 | 60 | 16.3 |
| Example 16 | 0.4 | Lithium Cobalt Oxide | 40 | 30 | 25 |
| Example 17 | 0.7 | Lithium Cobalt Oxide | 35 | 40 | 28 |
| Example 18 | 5 | Lithium Cobalt Oxide | 0.05 | 99 | 30 |
| Example 19 | 0.8 | Lithium Cobalt Oxide | 0.5 | 45 | 23 |
| Comparative Example 1 | 5 | — | — | 100 | 35 |

According to the above results, the internal resistances of the electrode materials of Examples 1 to 19 were in a range of about 11Ω to 30Ω, and the internal resistance of Comparative Example 1 was 35Ω. As such, the internal resistances of the electrode materials of Examples 1 to 19 were lower than that of the electrode material of Comparative Example 1. Therefore, it was found that the internal resistance can be decreased when the electrode materials of Examples 1 to 19 are used as an electrode material of a lithium ion battery.

Further, when the electrode materials of Examples 1 to 19 were compared to each other, the following was found. The electrode materials of Examples 1 to 15 were formed of aggregates that were obtained by allowing carbon-coated electrode-active material particles, in which the carbon coating film was formed on the surfaces of the electrode-active material particles with a coverage of 50% or greater, to aggregate. In addition, the electrode materials of Examples 1 to 15 contained 0.1% by weight to 30% by weight of the content of the ion-conductive material, and the internal resistances were in a range of 11.6Ω to 19.9Ω.

In addition, the internal resistances of these electrode materials were lower than 20.0Ω and were lower than those of Examples 16 to 19. Therefore, it was found that the internal resistance could be decreased when the electrode materials of Examples 1 to 15 were used as an electrode material of a lithium ion battery.

The invention is applicable to a cathode material for a battery, an electrode material which is suitably used for a cathode material for a lithium ion battery, an electrode including this electrode material, and a lithium ion battery including a cathode formed of the electrode.

What is claimed is:

1. An electrode material,
wherein a carbon coating film containing an ion-conductive material is formed on surfaces of an electrode-active material core particle consisting of one primary particle,
at least a portion of a surface of the ion-conductive material is exposed without being coated with the carbon coating film or the ion-conductive material is surrounded by the carbon coating film,
the electrode-active material core particle contains a first lithium compound having the formula $Li_xA_yD_zPO_4$ wherein A represents one or two or more elements selected from the group consisting of Co, Mn, Ni, Fe, Cu, and Cr; D represents one or two or more elements selected from the group consisting of Mg, Ca, S, Sr, Ba, Ti, Zn, B, Al, Ga, In, Si, Ge, Sc, Y, and rare earth elements; $0<x<2$; $0<y<1.5$; and $0\leq z<1.5$,
the amount of carbon in the carbon coating film is 0.4 to 4 parts by mass with respect to 100 parts by mass of the electrode-active material core particle,
a thickness of the carbon coating film is 1.0 nm to 10.0 nm,
the average thickness of the carbon coating film is 2.0 nm to 7.0 nm, and
the ion-conductive material is a second lithium compound or a manganese compound selected from the group consisting of $Li_3PO_4$, $MnO_2$, LiPON, $Li_7La_3Zr_2O_{12}$, $La_{0.62}Li_{0.16}TiO_3$, and $Li_{10}GeP_2S_{12}$.

2. The electrode material according to claim 1,
wherein a mass ratio of the ion-conductive material is in a range of 0.1% by mass to 30% by mass.

3. The electrode material according to claim 1,
wherein a coverage of the carbon coating film on the surfaces of the electrode-active material core particle is 50% or greater.

4. The electrode material according to claim 1,
wherein the carbon coating film is formed by mixing the electrode-active material core particle, the ion-conductive material, and a carbon coating film precursor with each other to obtain a mixture and heating the mixture.

5. The electrode material according to claim 1,
wherein the electrode-active material core particle and the ion-conductive material are in contact with each other, and at least a partial component of the ion-conductive material form a solid-solution with the electrode-active material core particle.

6. An electrode, comprising the electrode material according to claim 1.

7. A lithium ion battery, comprising a cathode formed of the electrode according to claim 6.

8. The electrode material according to claim 1, wherein the carbon coating film includes a carbonized organic compound.

9. The electrode material according to claim 1, wherein 80% or greater of the surface of the electrode-active material core particle is coated with the carbon coating film.

10. The electrode material according to claim 1, wherein all of the surface of the electrode-active material core particle is coated with the carbon coating film.

11. The electrode material according to claim 1, wherein the average particle size of the primary particle is 0.01 μm to 20 μm.

12. The electrode material according to claim 1, wherein the average particle size of the primary particle is 0.02 μm to 5 μm.

13. An electrode material,
wherein a carbon coating film containing an ion-conductive material is formed on surfaces of electrode-active material core particles, and the electrode-active material core particles coated with the carbon coating film form an aggregate,
at least a portion of a surface of the ion-conductive material is exposed without being coated with the carbon coating film or the ion-conductive material is surrounded by the carbon coating film,
the electrode-active material core particles contain a first lithium compound having the formula $Li_xA_yD_zPO_4$ wherein A represents one or two or more elements selected from the group consisting of Co, Mn, Ni, Fe, Cu, and Cr; D represents one or two or more elements selected from the group consisting of Mg, Ca, S, Sr, Ba, Ti, Zn, B, Al, Ga, In, Si, Ge, Sc, Y, and rare earth elements; $0<x<2$; $0<y<1.5$; and $0\leq z<1.5$,
the amount of carbon in the carbon containing film is 0.4 to 4 parts by mass with respect to 100 parts by mass of the electrode-active material core particles,
a thickness of the carbon coating film is 1.0 nm to 10.0 nm,
the average thickness of the carbon coating film is 2.0 nm to 7.0 nm, and
the ion-conductive material is a second lithium compound or a manganese compound selected from the group consisting of $Li_3PO_4$, $MnO_2$, LiPON, $Li_7La_3Zr_2O_{12}$, $La_{0.62}Li_{0.16}TiO_3$, and $Li_{10}GeP_2S_{12}$.

14. The electrode material according to claim 13, wherein the contact portion of the primary particles has a small cross-sectional area to form channel-shaped gaps inside the aggregate.

15. The electrode material according to claim 13, wherein a volume density of the aggregate is 50 vol % to 80 vol % with respect to a volume density of a case where the aggregate is solid.

* * * * *